United States Patent [19]

Renton

[11] Patent Number: 4,655,787

[45] Date of Patent: Apr. 7, 1987

[54] DEPOSITION PROCESSES: INCORPORATING SOLVENT DYE INTO ELECTROPHORETIC RESIN ON METAL SURFACE

[75] Inventor: Stanley Renton, Penkridge, England

[73] Assignee: Albright & Wilson Limited, Warley, England

[21] Appl. No.: 731,526

[22] Filed: May 7, 1985

[30] Foreign Application Priority Data

May 10, 1984 [GB] United Kingdom ................. 8411890

[51] Int. Cl.$^4$ ........................ C25D 13/06; B05D 3/10; C09D 5/44
[52] U.S. Cl. .......................................... 8/522; 8/552; 8/554; 8/558; 8/623; 8/938; 204/181.1; 204/181.4; 204/181.6; 204/181.7; 427/336; 427/337
[58] Field of Search ................... 8/558, 685, 522, 938; 204/181.1, 181.4

[56] References Cited

U.S. PATENT DOCUMENTS

| | | | |
|---|---|---|---|
| 3,619,399 | 11/1971 | Blank et al. | 204/181 |
| 3,839,174 | 10/1974 | Masuda et al. | 204/181 |
| 4,163,702 | 8/1979 | Rickert et al. | 204/181 |

FOREIGN PATENT DOCUMENTS

| | | |
|---|---|---|
| 53-136048 | 11/1978 | Japan . |
| 1498144 | 1/1978 | United Kingdom . |
| 2145737 | 4/1985 | United Kingdom . |

OTHER PUBLICATIONS

Chem. Abstracts, vol. 90 (1979) 191137r.

*Primary Examiner*—A. Lionel Clingman
*Attorney, Agent, or Firm*—Frishauf, Holtz, Goodman & Woodward

[57] ABSTRACT

A process for the deposition of a film of an electrophoretic resin upon the surface of a substrate which comprises the steps of (i) electrophoretically depositing from a bath comprising water, a water miscible organic solvent and the resin, a film of the resin upon the surface of the substrate (ii) immersing said film in a solution of a solvent dye in a solvent medium comprising water, a water miscible organic solvent and a hydrotrope, the amount of said solvent dye dissolved in said solvent medium being sufficient for the absorption into the resin film of sufficient dye to impart the desired coloration to the resin film, the amount of said hydrotrope and said solvent being sufficient so that said amount of such solvent dye will dissolve in the solvent medium and (iii) curing the resin.

27 Claims, No Drawings

DEPOSITION PROCESSES: INCORPORATING SOLVENT DYE INTO ELECTROPHORETIC RESIN ON METAL SURFACE

This invention relates to processes for the production of films of electrophoretic resins on the surface of metallic substrates.

The development in recent years of electrophoretic resin systems which can be applied to the surfaces of irregularly shaped substrates to provide a protective film of resin has led to a corresponding degree of interest in the properties of the cured resin systems. One difficulty which is inherent in the use of electrophoretic resin systems is that it is not easy to incorporate other compounds as additives in the resin film because of the difficulty of ensuring that these compounds are deposited with the resin film from the deposition bath. Compounds which carry the same electrical charge as the resin may be deposited with the resin but those carrying the opposite electrical charge will not. Attempts to incorporate resin additives into the cured resin so as to impart improved properties to the resin are inherently difficult because of the impermeable nature of the cured resin. Attempts have been made to introduce a dye into the uncured resin after it has been deposited but these have only been successful when using basic dyes which are polar and water soluble which can be absorbed into the uncured resin apparently by virtue of an electrical attraction between the resin and the dye. Attempts to use water insoluble solvent dyes have not been successful because the presence of the quantities of solvent required to dissolve the dye reduces the integrity of the resin film.

We have now discovered that it is possible to incorporate substantially water insolube additives into a film of electrophoretic resin by immersing the uncured resin film in a solvent medium comprising water and a water miscible organic solvent in which the additive is soluble and from which it can be absorbed into the resin which medium is formulated so as to avoid damage to the integrity of the uncured resin film. Accordingly from one aspect our invention provides a process for the deposition of a film of an electrophoretic resin upon the surface of a substrate which comprises the steps of (i) depositing a film of electrophoretic resin upon the surface of the substrate (ii) immersing said film in a solution of additive in a solvent medium comprising water and a water miscible organic solvent under such conditions that the resin additive is absorbed into the resin film without damage to the integrity of the resin film and (iii) curing the resin.

The electrophoretic resins which are useful in the processes of the present invention may be any anaphoretic or cataphoretic resin which is capable of electrodeposition from a water based emulsion. The preferred resins for use in the processes of this invention are those which are capable of forming a clear cured film of resin upon the surface of the substrate. Such resins are generally used in the form of salts of intially water insoluble polymers which have been at least partially solubilised e.g. insoluble acid resins which have been solubilised by neutralising carboxyl groups with a basic derivative of an alkali metal, ammonia or an organic amine. The solubilised resins are present in the deposition bath as a colloidal solution of resin. The bath from which the resin is deposited typically contains the resin in water together with a minor proportion of a water miscible organic solvent. Examples of electrophoretic resins include epoxy/urea formaldehyde blends and acrylic resins and their blends with polyesters. A large number of water miscible solvents may be employed. Examples of solvents which are commonly used are aliphatic alcohols and alkyl ether alcohols such as butoxy ethanol.

The resin bath may also comprise known resin additives which are capable of being deposited with the resin film. In particular the bath may incorporate pigment or pigment extenders and hence constitute an electrophoretic paint. Examples of pigments which are used in electrophoretic paints are suitable grades of titania and other inorganic oxides and carbon black. Where the resin contains a pigment the preference for a resin capable of forming a clear film is not relevant and resins which form a discoloured film may be utilised.

The deposition of the resin film is carried out using conventional electrodeposition techniques and conditions. The substrate is preferably cleaned, and may be pretreated by e.g. phosphating or chromating prior to being rinsed with deionised water and/or a dilute solution of a water miscible organic solvent prior to its immersion in the resin deposition bath. The substrate is allocated the appropriate polarity in an electrical circuit and the deposition is then carried out. The rate at which resin is deposited is proportional to the voltage which is applied. At a constant voltage the current passing falls as the thickness of the deposited film increases until deposition effectively ceases. Typically at an applied voltage of 20 to 300 volts the deposition of the resin will be complete within about 1 to 3 minutes. The application of higher initial voltages and hence the passage of higher current densities may lead to the formation of gas within the film which is disadvantageous and thereby less preferred. Where a relatively thick film of resin is desired the current density passing can be maintained by increasing the voltage during the deposition. However we prefer not to apply voltages of greater than about 50 volts.

The thickness of the deposited resin film after curing is normally from 1 to 50 microns e.g. from 1 to 20 more usually from about 3 to 30 microns and commonly from 3 to 10 microns. The thicker films are preferable if the substrate is to be utilised in an environment where a greater degree of protection is desired. The uncured resin film will normally contain minor proportions of water and organic solvent. Normally the uncured resin will comprise from 92 to 98% more usually approximately 95% by weight solid material the balance being entrapped water and solvent. The composition of the uncured resin film will vary according to the nature of the resin, the composition of the resin deposition bath and the conditions under which deposition has taken place. It is possible to reduce the proportion of the entrapped solvent and resin to some extent e.g. by prolonging the application of the voltage beyond the point at which deposition has effectively ceased but this is less preferred since the presence of the some entrapped solvent and water appears to enhance the absorption of the resin additive during the next step of the process.

The second step of the process may be utilised to introduce a variety of resin additives into the uncured resin film. Examples of additives which could advantageously be incorporated into the resin include dyestuffs, especially certain solvent dyes and disperse dyes, U.V. stabilisers such as the substituted benzophenones e.g. 2, 4 dihydroxybenzophenone, 2, hydroxy 4 methoxybenzophenone, 2 hydroxy 4 octyoxybenzophenone, 2, 2, 4, 4 tetrahydroxybenzophenone, 2, 2 dihydroxy 4 4 dimethoxybenzophenone, 2 hydroxy 4 dodecyloxybenzophenone; antioxidants such as thio bis 2-napthol; 2, 2, methylene bis(4-ethyl-6-tertiary butyl phenol) and 2, 2 methylene bis(4 methyl-6-tertiary butyl phenol), plasticizers, corrosion inhibitors, antistatic agents, such as stearamidopropyl-dimethyl B hydroxy ethyl ammonium nitrate and stearamidopropyl dimethyl B hydroxy ethyl ammonium dihydrogen phosphate.

To be useful in the processes of the present invention the additives are those which have some solubility in the deposited resin film and which can be dissolved in the solvent medium. These additives will be insoluble or have only a very limited solubility in water say less than 10 gms/liter at 25° C. They cannot be absorbed from aqueous solution into the uncured resin. They are all soluble in a solvent medium comprising water and water miscible organic solvent to a degree which permits the absorption of the desired amount of the additive into the uncured resin film said solvent medium being one which does not damage the integrity of the uncured resin film during the absorption step of the process.

The absorption process may be carried out by immersing the substrate which has a coating of uncured resin in a bath containing the solvent medium. The absorption is preferably carried out at ambient temperature but can be carried out at elevated temperatures e.g. in the range 5° to 60° C. The immersion time may vary through a wide range but care should be taken to ensure that prolonged exposure to the solvent medium does not damage the integrity of the uncured resin film. The additive is absorbed into the resin film to the extent that the substrate may be rinsed with water at the end of the absorption step without any significant quantity of additive being removed from the film.

The solvent medium should be formulated so that the additive will be absorbed into the uncured resin film in the desired quantities. The desired quantity of additive which is absorbed into the resin varies according to the nature of the additive and the desired properties of the finished resin. For example where the additive is a dyestuff the quantity which is desirably absorbed will be that which imparts the desired degree of colouration to the film. Because of the thickness of the resin film the weight of the additive which is absorbed will be relatively small compared to the quantity dissolved in the solvent medium. The medium should fulfil three separate criteria in order to be useful in the processes of this invention. Firstly it should not significantly damage the integrity of the uncured resin film. Secondly it should be capable of dissolving a sufficient quantity of the resin additive such that thirdly the resin additive will be partitioned between the solvent medium and the uncured resin in a proportion such that the desired quantity of additive is absorbed into the uncured resin.

The composition of the solvent media may be adjusted so as to meet these criteria. The choice of the organic solvent can be varied. An inert salt such as sodium chloride or sodium sulphate may be dissolved in the solvent medium in such quantities as will promote the absorption of the resin additive by the uncured resin film a preferred alternative is the addition of a hydrotrope to the solvent medium. We have discovered that a solvent medium comprising water, water miscible organic solvent and a hydrotrope is especially valuable for use in the processes of this invention because the amount of organic solvent can generally be reduced and the tendency of the solvent medium to damage the integrity of the film is thereby reduced.

The solvent which is employed in the absorption bath may be the same solvent that was present in the resin deposition bath. However many other solvents may be employed provided that they are water miscible. Examples of such solvents are aliphatic alcohols such as methanol, ethanol, propanol and butanol and isomers thereof; substituted aliphatic polyhydric alcohols and condensation products thereof such a butyne 1:3 diol and ethoxylated derivatives thereof, glycols, substituted glycols, glycol ethers, hydroxy ethers, esters of such alcohols e.g. diethylene glycol acetate, mono di and triethanolamine; ketones especially those of low molecular weights which are water soluble e.g. acetone, methyl ethyl ketone, diethyl ketone; cyclic ethers such as tetrahydrofuran, dioxane and derivatives thereof; aliphatic acids such as butyric acid and substituted derivatives thereof such as formamide and dimethyl formamide. Mixtures of such solvents can be employed provided the mixture is water miscible and thus provides a homogeneous solvent medium.

The solvent media used in the absorption step of the processes of this invention may preferably comprise a hydrotrope. Hydrotropes are a known class of compound which have been defined as "organic compounds having hydrophilic and hydrophobic properties which are capable in high concentrations of increasing the solubility of other organic compounds in water or in aqueous salt solution". Many substances are known to possess hydrotropic properties. Examples of such compounds are urea, the alkali metal and ammonium salts of aromatic sulphonic acids containing a total of from 6 to 10 carbon atoms per molecule such as the benzene, toluene, xylene and cumene sulphonic acids, the phosphate esters of ethoxylated alkyl phenols, the phosphate esters of ethoxylated alcohols the phosphate esters of alkyl polyglycol ether including the mono di and tri esters, of such compounds and mixtures of the mono di and tri esters alkyl polyglycol ether ammonium methyl sulphates, sodium benzoate, the sodium salt of N-benzyl sulphonic acid, dimethyl urea, guanidine chloride, acetamide, propionamide, N-methyl acetamide, sodium 3-hydroxy-2-napthoate, nonionic materials including all those described in U.S. Pat. No. 4,405,329 such as reaction product, having a molecular weight of about 2,000 to 7,000 of (a) a monohydric to hexahydric alcohol having 1 to 6 carbon atoms, monalkylamines or monoalkylolmonoamines or polyalkylenepolyamines and (b) 1,2-propylene oxide, a reaction product of an alkylene oxide and a water-insoluble aliphatic monoalcohol having at least 8 carbon atoms, a reaction product of an alkylene oxide and an arylphenol or alkylphenol, a reaction product of a saturated dicarboxylic acid having 3 to 10 carbon atoms and 1,2-propylene oxide or a polypropylene glycol, a reaction product of a fatty acid having 10 to 18 carbon atoms and 1,2 propylene oxide or a polypropylene glycol, a reaction product of a fatty acid having from 10 to 18 carbon atoms, a trihydric to hexahydric alcohol and 1,2-propylene oxide or a reaction product of a fatty acid having 10 to 18 carbon atoms, a polyalkylpolyamine and 1,2-propylene oxide.

The nature and quantity of the solvent and the hydrotrope govern the efficiency with which the additive is absorbed into the uncured resin film apparently by affecting the partition of the additive between the solvent medium and the film. The nature of solvent medium may be varied so as to encourage the absorption of the additive by the film. In particular the addition of inert salts such as sodium chloride and sodium sulphate to the absorption bath may be advantageous in this way. Thus the solvent medium may contain from 1 to 100 and preferably from 5 to 50 gms/liter of an inert salt.

The uncured resin film deposited on the surface of the substrate retains some residual electrical charge. Thus anaphoretic resins retain some negative charge and cataphoretic resins some positive charge. The absorption of any additive into the film may be affected by electrostatic interactions if the additive has some polar character. In the preferred processes of this invention in which the solvent medium comprises a hydrotrope it may be necessary to select a hydrotrope which will facilitate the absorption of the resin additive. The hydrotrope appears to form a complex with the additive and if the hydrotrope is ionised in the solvent medium the complex will be charged which charge may be the same or opposite to the residual charge of the resin film. In these circumstances the hydrotrope should be selected so as to lead to the formation of a complex which is attracted to rather than repelled by the uncured resin film. Thus a positively charged hydrotrope is preferably employed when the resin film is an anaphoretic resin and a negatively charged hydrotrope is preferably employed with a cataphoretic resin so as to facilitate the absorption of the additive.

The solvent medium in the absorption bath will normally comprise a major proportion of water. In the preferred embodiment the quantity of hydrotrope which is added to the bath may vary within a wide range e.g. from 1 to 500 preferably from 5 to 300 and more preferably from 50 to 200 gms/liter. The quantity which is effective in solubilising the additive varies with the nature of the hydrotrope, the nature and quantity of the organic solvent present and the nature of the additive. In general it is preferred to reduce the amount of organic solvent to a minimum in order to minimise the degradation of the resin film. The presence of some organic solvent in the absorption bath is essential and the minimum solvent concentration in the bath is generally within the range 20 to 100 gms/liter but this may vary significantly with the nature of the organic solvent. In the case of 2-butoxy ethanol which is a preferred organic solvent the bath will preferably contain from 50 to 200 and more preferably from 75 to 150 gms/liter of organic solvent.

After the substrate is removed from the absorption bath the resin is rinsed and cured using conventional techniques. Certain electrophoretic resins are commonly cured by stoving at elevated temperature the exact conditions being dependant upon the nature of the resin. Typically stoving is effected at temperatures of from 100° to 250° C. more usually 150° to 200° C. Other resins may be cured using other techniques such as infra-red and electron beam curing.

The preferred resin additives for use in the processes of the present invention are the solvent dyes. Solvent dyes are a class of dyes which are not soluble or are insufficiently soluble in water to be incorporated into aqueous dyebaths. This class of dyes includes dyes having a variety of chemical structures such as certain azo dyes, certain triphenylmethane dyes, certain anthraquinone dyes and certain copper phthalocyanine dyes. Where appropriate we prefer to use the metallised forms of the dye. A particularly preferred class of solvent dyes for use in the processes of the present invention are the azo dyes and especially the 1:2 metallised azo dyes. Examples of particular dyes which are useful in the processes of this invention are (using the Colour Index designation) Solvent Yellow 25, Solvent Orange 11 and Solvent Orange 59.

The quantity of dye which need be present in the absorption bath can vary through a wide range according to the nature of dye, the nature of the resin and the composition of the solvent medium. Typically the dye is present in a concentration of from 0.01 to 50.0 gms/liter more usually from 0.05 to 5.0 gms/liter and commonly from 0.1 to 2.0 gms/liter.

The invention is illustrated by the following examples.

EXAMPLE 1

Three separate dyebaths were made up as follows.

(a) 0.5 gm Solvent Yellow 25 dissolved in 200 ml butoxy ethanol and diluted to 1 liter with water. Dye remained in solution.

(b) 0.5 gm Solvent Yellow 25 dissolved in 100 ml of butoxy ethanol and diluted to 1 liter with water. Dye separates as an oil/emulsion.

(c) 0.5 gm Solvent Yellow 25 dissolved in 100 ml butoxy ethanol and added to 900 ml water in which 55.8 gm of sodium xylene sulphonate had been dissolved. The dye remained in solution.

3 identical nickel plated panels which had been coated with an anaphoretic acrylic resin under identical conditions using an applied voltage of 30 volts for 2 minutes and had then been rinsed with deionised water were immersed in the three dyebaths for a period of 2 minutes at 25° C. The panels were subsequently rinsed and stoved at 180° C. with the following results.

(a) Resin film dyed satisfactorily but was attacked by solvent. The appearance after stoving was not satisfactory.

(b) Resin fim dyed but spots of intense colour are present giving rise to a product having an unacceptable spotty appearance, due to the separation of dye as an oily phase.

(c) The resin film dyed uniformly without spots or degradation of the surface after stoving.

EXAMPLE 2

Separate nickel plated panels were coated with the anaphoretic acrylic resin utilised in Example 1 using the same conditions for the deposition as were utilised in Example 1. A panel was then immersed in each of a series of absorption bath solvent media having the compositions shown in the following Table. These solvent media were made up by dissolving the additive in the water miscible organic solvent, adding this solution to deionised water and adding a solution of the hydrotrope to this solution.

(a) Additive—dye Colour Index Solvent Yellow 89
Additive Concentration—1 gm/liter
Hydrotrope—sodium xylene sulphonate
Organic Solvent—2 butoxy ethanol

| Solvent Media | A | B | C | D |
|---|---|---|---|---|
| Solvent Concentration (gms/liter) | 50.0 | 75.0 | 100.0 | 125.0 |
| Hydrotrope Concentration (gms/liter) | 120.0 | 75.0 | 33.0 | 0 |

In solvent media A B and C the panels were coloured. Solvent medium D damaged the integrity of the coating.

(b) Additive—dye Colour Index Solvent Orange 11
Additive Concentration—1 gm/liter
Organic Solvent—2 butoxyethanol
Hydrotrope—An alkyl polyglycol ether ammonium methyl sulphate as sold under the Trade Mark BEROL 563 by Berol Kemi AB.

| Solvent Media | A | B |
| --- | --- | --- |
| Hydrotrope Concentration (gms/liter) | 3.0 | 4.0 |
| Solvent Concentration (gms/liter) | 100 | 100 |

Medium A was not capable of dissolving the desired concentration of additive.

EXAMPLE 3

Separate test pieces (nickel plated panels) were coated with cataphoretic resins by applying a voltage of 25 volts for 2 minutes using a bath containing 100 gms/liter of resin. The resin was an epoxy/urea formaldehyde resin.

Separate test pieces (nickel plated panels) were coated with an anaphoretic resin by applying a voltage of 30 volts for 1 minute using a bath containing 80 gms/liter of resin. The resin was an acrylic/polyester resin.

The test pieces were immersed in 2 separate solvent media A and B having the following compositions.

| Solvent Medium | A | B |
| --- | --- | --- |
| Additive - Dye Colour Index Solvent Brown 28 | 1 gm/liter | 1 gm/liter |
| Solvent - 2 butoxyethanol | 100 gms/liter | 100 gms/liter |
| Hydrotrope Sodium xylene sulphonate | 50 gms/liter | |
| Berol 563 (see Example 2) | | 5.0 gms/liter |

The pieces were immersed for a period of 2 minutes at 25° C.

The cataphoretic resin was coloured satisfactorily without any degradation of resin in bath solvent Media A and B.

The anaphoretic resin was coloured satisfactorily without any degradation of resin in Solvent Medium B. This resin was not coloured in Solvent Medium A. This example shows the desirability of using a cationic hydrotrope to colour an anaphoretic resin when using The Dye Solvent Brown 28 as the additive apparantly because Solvent Brown 28 is weakly anionic.

What I claim is:

1. A process for the deposition of a film of an electrophoretic resin upon the surface of a metal substrate which comprises the steps of
   (i) electrophoretically depositing from a bath comprising water, a water miscible organic solvent and an anaphoretic or cataphoretic resin, a film of the resin upon the surface of the metal substrate
   (ii) immersing said film in a solution of a solvent dye in a solvent medium comprising water, a water miscible organic solvent and a hydrotrope, the amount of said solvent dye dissolved in said solvent medium being sufficient for the absorption into the resin film of sufficient dye to impart the desired colouration to the resin film, the amount of said hydrotrope and said solvent being (a) sufficient so that said amount of such solvent dye will dissolve in the solvent medium, and (b) such that said desired coloration is imparted to said resin film while immersed in said solvent medium without significant damage to the resin film and
   (iii) curing the resin.

2. The process of claim 1, wherein the electrophoretic resin is an epoxy/urea formaldehyde resin, an acrylic resin or a blend of (a) said epoxy/urea formaldehyde resin or (b) said acrylic resin with a polyester resin.

3. The process of claim 1, wherein the resin film after curing which is deposited in step (i) is at least one micron thick.

4. The process of claim 3, wherein the resin film after curing is from 1 to 20 microns thick.

5. The process of claim 4, wherein the resin film after curing is from 5 to 10 microns thick.

6. The process of claim 1, wherein the solvent medium in which the solvent dye is dissolved, comprises water and a water miscible organic solvent selected from the group consisting of water soluble alcohols, glycol ethers and ketones.

7. The process of claim 6, wherein said organic solvent is butoxyethanol.

8. The process of claim 6, wherein the bath from which the resin is deposited in step (i) and the solvent medium in which the solvent is dissolved in step (ii) both contain the same water miscible solvent.

9. The process of claim 6, wherein the solvent medium comprises from 20 to 100 gms/liter of organic solvent.

10. The process of claim 7, wherein the solvent medium comprises from 75 to 150 gms/liter of butoxyethanol.

11. The process of claim 1, wherein the dye is a metallized Solvent Dye.

12. The process of claim 11, wherein the dye is a metallized azo dye.

13. The process of claim 11, wherein the dye is present in the solvent medium in a quantity of from 0.05 to 5.0 gms per liter.

14. The process of claim 13, wherein the dye is present in a quantity of from 0.1 to 2.0 gms/liter.

15. The process of claim 1, wherein the hydrotrope is an alkali metal or ammonium salt of an aromatic sulphonic acid containing a total of from 6 to 10 carbon atoms per molecule.

16. The process of claim 1, wherein the solvent medium contains from 1 to 500 gms/liter of a hydrotrope.

17. The process of claim 16, wherein the solvent medium comprises from 50 to 200 gms/liter of a hydrotrope.

18. The process of claim 2, wherein the solvent medium comprises a hydrotrope which is an alkali metal or ammonium salt of an aromatic sulphonic acid comprising a total of frofm 6 to 10 carbon atoms per molecule.

19. The process of claim 18, wherein the solvent medium comprises a water miscible organic solvent selected from the group consisting of water soluble alcohols, glycol ethers and ketones.

20. The process of claim 1, wherein the solvent medium comprises a water miscible organic solvent selected from the group consisting of water soluble alcohols, glycol ethers and ketones.

21. The process of claim 18, wherein the solvent medium comprises a water miscible organic solvent selected from the group consisting of water soluble alcohols, glycol ethers and ketones;

the solvent medium comprises from 20 to 100 gms/liter of organic solvent;

the dye is present in the solvent medium in a quantity of from 0.05 to 5.0 gms per liter;

the solvent medium contains from 1 to 500 gms/liter of a hydrotrope.

22. The process of claim 18, wherein the solvent medium comprises a water miscible organic solvent selected from the group consisting of water soluble alcohols, glycol ethers and ketones;

the solvent medium comprises from 75 to 150 gms/liter of organic solvent;

the dye is present in the solvent medium in a quantity of from 0.1 to 2.0 gms per liter;

the solvent medium contains from 50 to 200 gms/liter of a hydrotrope.

23. The process of claim 21, wherein the resin film after curing is from 1 to 20 microns thick, and the dye is a metallized Solvent Dye.

24. The process of claim 22, wherein the resin film after curing is from 5 to 10 microns thick, and the dye is a metallized azo dye.

25. The process of claim 24, wherein said dye is selected from the group consisting of Solvent Yellow 25, Solvent Orange 11 and Solvent Orange 59.

26. The process of claim 25, wherein butoxyethanol is used as the water miscible solvent in step (i) and also in step (ii).

27. The process of claim 1, wherein said dye is selected from the group consisting of Solvent Yellow 25, Solvent Orange 11 and Solvent Orange 59.

* * * * *